United States Patent [19]

Alber et al.

[11] Patent Number: 4,624,860

[45] Date of Patent: Nov. 25, 1986

[54] METHOD OF APPLYING A COATING TO A METAL SUBSTRATE USING BRAZING MATERIAL AND FLUX

[75] Inventors: Norman E. Alber, Mentor; Manek R. Dustoor, Cleveland Heights; Edward K. Hellier, Parma Heights; Vito N. Scotese, Mayfield Heights, all of Ohio

[73] Assignee: Imperial Clevite Inc., Glenview, Ill.

[21] Appl. No.: 787,132

[22] Filed: Oct. 15, 1985

[51] Int. Cl.$^4$ ............................................. B05D 3/02
[52] U.S. Cl. .................................... 427/46; 156/62.8; 219/85 A; 219/86.1; 219/76.12; 219/76.17
[58] Field of Search ................. 219/85 A, 86.1, 76.12, 219/76.17; 156/62.8; 427/46

[56] References Cited

U.S. PATENT DOCUMENTS

| | | | |
|---|---|---|---|
| 3,093,719 | 6/1963 | Miller | 219/85 A |
| 3,743,556 | 7/1973 | Breton et al. | 156/62.8 |
| 3,778,586 | 12/1973 | Breton et al. | 219/86.1 X |
| 3,864,124 | 2/1975 | Breton et al. | 75/212 |
| 3,936,656 | 2/1976 | Middleton et al. | 219/76.12 |
| 3,983,357 | 9/1976 | Whitney, Jr. et al. | 219/85 A |
| 4,194,040 | 3/1980 | Breton et al. | 428/308 |

Primary Examiner—Thurman K. Page
Attorney, Agent, or Firm—Russell E. Baumann

[57] ABSTRACT

A method for bonding a coating material to a substrate wherein the properties of the substrate material need to be precisely controlled which comprises providing a substrate which is to be coated, supplying a brazing material adapted to come into contact with and coat at least a part of the substrate, positioning a sheet of coating material distributed in a polytetrafluoroethylene fibrous material in close proximity to said substrate, heating said substrate and coating and brazing materials to a temperature which starts melting of said braze material wherein said heating is done by an induction generator thereby allowing for precisely controlled heating effect, and cooling said substrate, braze and coating material, thereby bonding said coating material to the substrate.

9 Claims, 3 Drawing Figures

METHOD OF APPLYING A COATING TO A METAL SUBSTRATE USING BRAZING MATERIAL AND FLUX

BACKGROUND OF THE INVENTION

The present invention relates to a means of bonding a coating material to an article and more particularly to means of bonding a uniform coating material to an article in which metallurgical properties of the substrate material of the article are carefully controlled in the process.

It has been found advantageous to coat a substrate with a coating having special properties, for example, wear resistance or corrosion resistance. A method for providing this coating on a substrate is the use of flexible preforms using fibrillated polytetrafluoroethylene (PTFE) as the binder material as disclosed in U.S. Pat. No. 3,743,556. The method for metallurgically bonding the flexible preform containing the coating material onto the substrate material has been furnace fusion, either a forced atmosphere furnace using a protective atmosphere, or a vacuum furnace. A major limitation to this approach, however, is the necessity to expose the entire substrate to the required high fusion temperature. This can have an undesirable effect on the substrate material by promoting metallurgical changes such as grain growth or phase changes that could significantly influence the performance characteristics of the substrate. Further, the propensity for article distortion is high. Still another limitation of the conventional use of furnace fusion is the article size that can be accommodated in the furnace and the economics of the energy use associated with furnace heating and atmosphere control, especially when only a small area has to be coated on a relatively large article.

Some of the above-mentioned limitations can be partially overcome with the use of resistance fusion techniques, as disclosed in U.S. Pat. No. 3,778,586. However, this resistance fusion technique has the limitation that the coating area has to be quite small.

Accordingly, it is a principal object of this invention to provide a means for applying a uniform coating material to an article in which the heating of the substrate material of the article to produce the bond is needed to be selectively controlled.

Another object of this invention is to provide a means for applying a uniform coating material to an article in a continuous manner and/or having a large or irregular surface area.

Other objects of the invention will become apparent to those skilled in the art from a reading of the following specification and claims.

SUMMARY OF THE INVENTION

In one aspect, the present invention is directed to a process for applying a uniform coating material to an article wherein the properties of a substrate material of the article need to be selectively controlled, which method comprises providing a substrate which is to be coated, supplying a brazing material adapted to come into contact with and coat at least part of the substrate, positioning a sheet of coating material distributed in a polytetrafluoroethylene fibrous material in close proximity to said substrate, heating said substrate and coating and brazing materials to a temperature which starts melting of said braze material wherein said heating is done by an induction generator, thereby allowing for a precisely controlled heating effect, and cooling said substrate, braze and coating material, thereby bonding said coating material to said article.

In another aspect, the present invention is directed to a process for continuously applying a uniform coating material to a substrate wherein the properties of the substrate need to be selectively controlled, which method comprises providing the substrate which is to be coated, supplying a brazing material adapted to come into contact with and coat at least part of the substrate, positioning a sheet of coating material distributed in a polytetrafluoroethylene fibrous material in close proximity to said substrate, heating said substrate and coating material wherein said heating is sufficient to only start the melting of the braze material and provide for wetting of the substrate and is done by induction generator thereby providing for a precisely controlled heating effect, moving said article relative to the induction generator at speeds that said braze continues to melt, and cooling said substrate, braze and said coating material, thereby bonding said coating material to said substrate.

Another aspect of the present invention is directed to a process for applying a coating material to a substrate wherein the properties of the substrate material need to be precisely controlled, which method comprises providing a substrate which is to be coated, supplying a brazing material adapted to come into contact with and coat at least a part of the substrate, positioning a sheet of coating material distributed in a polytetrafluoroethylene fibrous material in close proximity to said substrate, heating said coating and braze materials and said article wherein said heating is sufficient to start the melting of the braze material and provide for wetting of said substrate, and is done by an induction generator so as to provide for only heating surface portions of the substrate and cooling said substrate and coating and braze materials, thereby bonding said coating material to said substrate.

DESCRIPTION OF THE PREFERRED EMBODIMENT OF THE INVENTION

Figure 1:
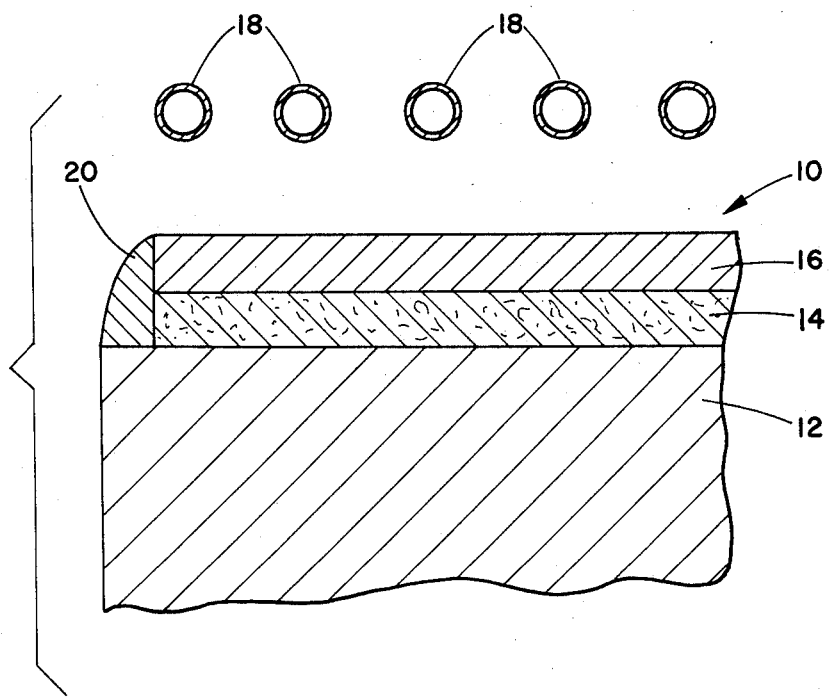
FIG. 1 is a cross-sectional view showing a portion of an article in the process of production according to the present invention.

As generally shown in FIG. 1, an article 10 has a substrate 12. It is common for the article 10 to be made from a metallic material such as steel or alloys thereof, although it could equally well be made from a multi-layer material. A coating material layer 14 is preferably prepared by using polytetrafluoroethylene (PTFE) as a binder material and mixing it with the desired matrix powder material and then working it to produce fibrils of PTFE which entrap the matrix powder material, as generally discussed in U.S. Pat. Nos. 3,864,124 and 4,194,040, which are incorporated herein by reference. The PTFE is generally in the range of about 1 to 25 percent by volume with the matrix powder material being the balance of the sheet. The sheets commonly have a solids density of approximately 50 to 70 percent by volume. Typically, matrix powder materials are chosen for their wear-resistant or corrosion-resistant properties and are materials such as tungsten carbide, iron/nickel alloys, etc. The layer 14 resembles a piece of cloth.

A braze material layer 16 is provided which has a solids temperature lower than that of the article substrate and of the coating matrix material. The braze layer can be in the form of a solid material or in the form of particles of material in an organic binder or in the form of clothlike material using the fibrils of PTFE as the binder material as described above for the coating material. Typical examples of braze materials used are Nicrobraz TM 150 (Trademark of Wall Colmonoy Corp.), 15.0% Cr, 3.5% B and balance Ni, BNi-2 and BNi-3 (American Welding Society designations). Further, it is to be understood that the braze may be incorporated with coating material in the PTFE binder material as a single layer material. That is, layers 14 and 16 can be incorporated as one layer.

In the practice of this invention fluxing material (not shown) is used. This flux material is applied to the braze material coating sheet and to the substrate to control oxidation of these components during the heating operation, to be discussed completely hereinafter. The use of this flux does away with the need for special protective enclosures and atmospheres as used in furnace fusion. While not an essential requirement of the process of this invention, it is often desirable to mix an adhesive with the flux which, in turn, is spread over the braze and coating materials and on the substrate in the area in which bonding is to take place. This adhesive material helps to properly position the coating on the substrate. Various adhesives and fluxes can be used. A typical flux used is a fluoride type flux such as Nicrobraz TM flux (Trademark of Wall Colmonoy Corp.) and a typical adhesive used is a sodium silicate based adhesive with 1% hydroxy ethyl cellulose.

In accordance with this invention the substrate with the coating material and braze material are heated by an induction generator. The process involves the generating of heat within the article by electromagnetic induction with the substrate being present between a coil 18. Alternating current from a generating unit (not shown) flows through coil 18 resulting in an alternating magnetic field in the coil. This, in turn, induces a voltage within the substrate that lies in the fluctuating magnetic field of the coil so that the resistance to the passage of the resulting current in the substrate generates an induction heating effect. It has been found that with high frequency induction generators, the heating influence becomes increasingly limited to the surface of the substrate. It has been found particularly desirable for our use to employ induction units in which the frequencies employed are in excess of 10 kHz and preferably 25 kHz to 450 kHz.

Depending on the shape and surface area of the substrate to be coated, one of two techniques can be employed in accordance with this invention: (a) the static mode where the coil and the sample are stationary, with the coil encompassing the area to be coated, and (b) the transversing mode where the sample or the coil moves in relation to the other, with the coil successively heating segments of a larger coating area.

It is particularly important when the substrate area to be coated is continuous that the induction heating is carefully controlled to ensure that melting of the braze is allowed to occur and adhere the coating to the substrate (i.e. wet the substrate), while the temperature is kept below that of the melting point of the substrate material. If the substrate is of such a size/shape that it needs to be traversed under the coil of the induction generator, a braze melt initiator 20 consisting of a concentrated mixture of braze powder with the flux/adhesive may be applied to the leading edge of the sample to be coated to better control melting. Also, a mixture of the braze powder and flux adhesive can be coated on the surface of the substrate prior to positioning the coating to help achieve an adherent bond.

Typically, upon induction heating the braze infiltrates the underlying porous flexible preform coating and wets the substrate, as is more fully described in U.S. Pat. No. 3,743,556, incorporated herein by reference. During the heating, the PFTE is volatilized and upon cooling, the coating with braze is securely adhered to the substrate while maintaining the properties of the substrate relatively unaffected.

The coated substrate is then ready for further fabrication, if desired. The substrate has a uniform coating of desired material and thickness in which physical characteristics of the substrate remain essentially the same as before coating.

The subject invention will now be described in greater detail with reference to the following examples of prior art and preferred practices of the invention. These examples are set forth for the purpose of illustrating the invention and are not intended to limit the same.

EXAMPLE I

A substrate of 1018 steel was used to be coated with a hard facing coating of tungsten carbide. The surface to be coated was grit blasted and cleaned to remove any surface contamination. A coating material of tungsten carbide was mixed with PTFE in the ratio of 20:1 volume percent and worked to fibrillate the PTFE and trap the tungsten carbide particles, thus making a clothlike sheet as fully described in U.S. Pat. No. 3,743,556. The coating sheet was fabricated to have a solids density of approximately 56% volume percent and a thickness of 0.060 inch.

A braze mixture of nickel, chromium and boron particles of 81.5, 15.0, and 3.5 percent, respectively, is mixed with PTFE in the ratio of 20:1 volume percent to form a clothlike sheet similar to that for the coating sheet set forth above. The sheets of the coating material and the braze material are cut into three-inch by eight-inch size preforms for bonding to the substrate. The coating material is then placed on top of the substrate surface with the braze material put on top of it and placed into a vacuum furnace at 2050° F. for 20 minutes. The braze material melts and infiltrates the coating material and upon the article being cooled provides a tungsten carbide coating on the steel substrate as generally described in U.S. Pat. No. 3,743,556. The microstructure of the coating and substrate are shown in FIG. 2(b).

EXAMPLE II

A substrate of 1018 steel similar to that used in EXAMPLE I was likewise to be coated with tungsten carbide. The coating sheet and braze sheet were prepared as described above for EXAMPLE I.

The preform sheets were then separately soaked in a 50/50 mixture of Nicrobraz TM flux and a sodium silicate based adhesive and then placed on the substrate after the substrate was also brushed with some of the flux/adhesive mixture. The coating material preform was applied directly on top of the substrate surface and the braze was applied on top of the coating material. A braze melt initiator consisting of a concentrated mixture of braze powder in a carrier of flux/adhesive is applied in thin layer to the leading edge of coating and braze. After drying, the sample substrate is then passed under the induction coil at a speed of approximately three inches per minute at a power setting of 65 kW. The speed and power settings will vary for different braze materials and coil designs but must be set such that initial melt of the braze takes place prior to the sample moving out of heating zone of the coil. The unit used is a 100 kW induction generator which operates at a frequency of 450 kHz. Upon progressive passage of the sample under the coil the melted braze preform infiltrates the underlying porous coating preform containing the tungsten carbide and then solidifies, providing for a uniform layer of tungsten carbide and braze bonded to the substrate. The final coating is approximately 0.060 inch thick, as shown in FIG. 2(a).

Figure 2A:
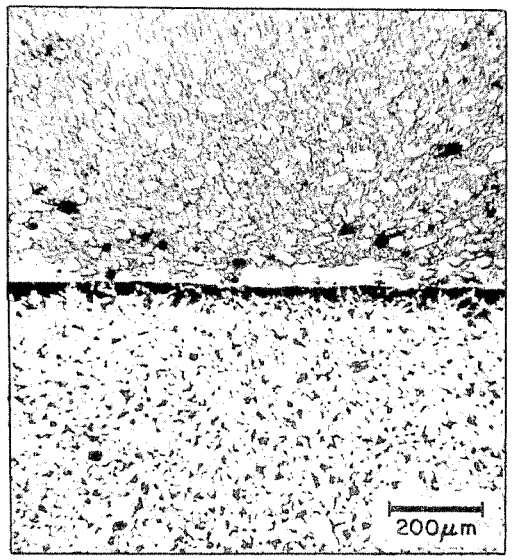
FIG. 2(a) is a photomicrograph of a coated substrate made according to the process of the present invention.
Figure 2B:
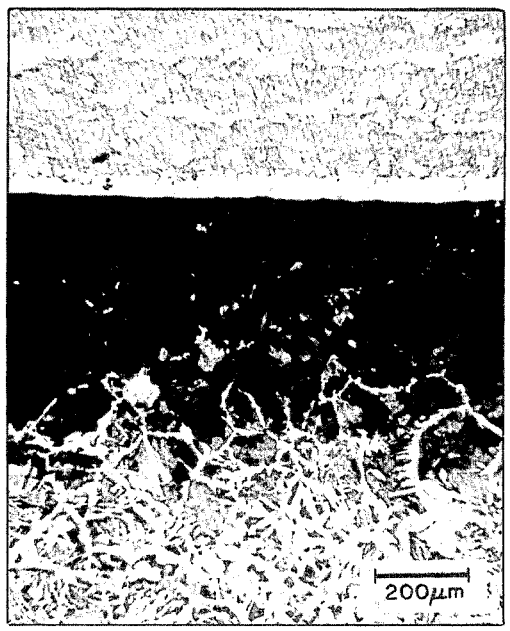
FIG. 2(b) is a photomicrograph of a coated substrate made according to prior art braze techniques.

As can be seen by comparing FIGS. 2(a) and 2(b), the microstructures of the substrate of the two samples are quite different. The specimen made by the prior art furnace technique has a greater grain size and exhibits considerable diffusion of elements between the coating and the steel substrate. The sample 2(a), on the other hand, made in accordance with the present invention has a very limited heat affected zone and thus the same general properties as the specimen prior to the coating process.

Thus, articles produced by the present invention have dimensionally controlled, uniform coating with specifically desired properties. The method of production allows for manufacturing in either a static or dynamic mode with the operation performed under ambient air conditions. Further, the process provides for controlling the heat affected zone to the outer surface layer(s) of the substrate to be coated.

While there have been described herein what are at present considered to be the preferred embodiments of this invention, it will be obvious to those skilled in the art that various changes and modifications may be made without departing from the invention, and it is, therefore, aimed in the appended claims to cover all such changes and modifications as fall within the true spirit and scope of the invention.

What is claimed is:

1. A method of applying a coating material to a metal substrate wherein the properties of the substrate material need be precisely controlled which method comprises providing a substrate which is to be coated with coating material;
supplying a brazing material adapted to come into contact with and coat at least a part of the substrate;
positioning a sheet of coating material distributed in a polytetrafluoroethylene fibrous material in close proximity to said substrate;
providing flux to said braze and coating materials and said substrate;
heating said flux, coating and braze materials and said article wherein said heating is sufficient to start the melting of the braze material and provide for wetting of said substrate and is done by an induction generator so as to provide for only heating surface portions of the substrate; and
cooling said substrate and flux, coating and braze materials, thereby bonding said coating material to said substrate.

2. The method as set forth in claim 1 in which an adhesive is added to said flux.

3. The method as set forth in claim 1 wherein said induction generator has a frequency in excess of 10 kHz.

4. The method as set forth in claim 1 wherein braze material is contained in the sheet of coating material.

5. A method for continuously applying a coating material to a metal substrate wherein the properties of the substrate need to be selectively controlled which method comprises providing a substrate which is to be coated with coating material;
applying a brazing material adapted to come into contact with and coat at least part of the substrate;
positioning a sheet of coating material distributed in a polytetrafluoroethylene fibrous material in close proximity to said substrate;
providing flux to said braze and coating materials and said substrate;
heating said substrate and said flux, braze and coating material wherein said heating is sufficient to only start the melting of the braze material and provide for wetting of the substrate and is done by induction generator thereby providing for a precisely controlled heating effect;
moving said article relative to the induction generator at a speed so that said braze continues to melt; and
cooling said substrate, flux, braze and coating material, thereby bonding said coating material to said substrate.

6. The method as set forth in claim 5 in which an adhesive is added to said flux.

7. The method as set forth in claim 5 wherein said induction generator has a frequency in excess of 10 kHz.

8. The method as set forth in claim 6 further including the step of providing a braze melt initiator consisting of a concentrated mixture of braze powder with flux applied to the leading edge of said substrate to be coated.

9. The method as set forth in claim 8 further including the step of providing a concentrated mixture layer of braze powder with flux to be placed on substrate area to be coated.

* * * * *